United States Patent
Kitta et al.

(10) Patent No.: US 7,955,068 B2
(45) Date of Patent: Jun. 7, 2011

(54) INJECTION MOLDING MACHINE

(75) Inventors: Hideaki Kitta, Numazu (JP); Motoyasu Ohue, Numazu (JP); Atsushi Takemoto, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/611,218

(22) Filed: Nov. 3, 2009

(65) Prior Publication Data
US 2010/0112120 A1    May 6, 2010

(30) Foreign Application Priority Data
Nov. 6, 2008    (JP) .................. 2008-285658

(51) Int. Cl.
B29C 45/80    (2006.01)
(52) U.S. Cl. .............. 425/145; 425/149; 425/150
(58) Field of Classification Search .................. 425/145, 425/149, 150
See application file for complete search history.

(56) References Cited

U.S. PATENT DOCUMENTS

| | | | | |
|---|---|---|---|---|
| 4,828,473 | A * | 5/1989 | Otake et al. .................. 425/145 |
| 5,129,808 | A * | 7/1992 | Watanabe et al. ............. 425/145 |
| 6,447,282 | B1 | 9/2002 | Miyauchi |
| 2003/0111756 | A1* | 6/2003 | Morita et al. ................. 264/40.5 |
| 2003/0219504 | A1* | 11/2003 | Harish et al. .................. 425/145 |
| 2003/0224085 | A1 | 12/2003 | Onuma et al. |
| 2005/0127546 | A1* | 6/2005 | Morita et al. ................. 264/40.1 |

FOREIGN PATENT DOCUMENTS
JP    2003-80559    3/2003

OTHER PUBLICATIONS

English Language Abstract of JP 2003-80559, published Mar. 19, 2003.
Machine English Language Translation of JP 2003-80559, published Mar. 19, 2003.
German Office Action issued in DE 10 2009 052 063.5 on Jan. 5, 2011.
English Language Translation of German Office Action issued in DE 10 2009 052 063.5 on Jan. 5, 2011.

* cited by examiner

Primary Examiner — Tim Heitbrink
(74) Attorney, Agent, or Firm — DLA Piper LLP US

(57) ABSTRACT

An injection apparatus includes a guide member on a frame via a guide member support mechanism. A screw rotation mechanism is assembled on the guide member. This prevents the guide member from being affected by deformation of the frame and allows the screw rotation mechanism to be smoothly moved. Thus, a screw rotatably coupled to the screw rotation mechanism can be smoothly moved.

6 Claims, 5 Drawing Sheets

INJECTION MOLDING MACHINE

CROSS-REFERENCE TO RELATED APPLICATIONS

This application is based upon and claims the benefit of priority from prior Japanese Patent Application No. 2008-285658, filed Nov. 6, 2008, the entire contents of which are incorporated herein by reference.

BACKGROUND OF THE INVENTION

1. Field of the Invention

The present invention relates to an injection molding machine, and in particular, to an injection molding machine having a structure in which a screw reciprocates smoothly axially.

2. Description of the Related Art

An injection molding machine includes a cylinder and a screw. The injection molding machine advances the screw in the cylinder and injects molten resin into a mold to mold a product. Thus, the injection molding machine includes a screw advancing and retracting mechanism advancing and retracting the screw inside the cylinder, and a screw rotation mechanism rotating the screw inside the cylinder in order to introduce resin pellets into the cylinder and to knead and melt the introduced resin pellets.

In a known injection molding machine, for example, an intermediate plate is supported on a slidable base (moving base) via a linear guide; a motor supporting the rear end of the screw via a bearing and rotationally driving the screw is attached to the intermediate plate. Furthermore, a linear motion mechanism advances and retracts the intermediate plate. Jpn. Pat. Appln. KOKAI Publication No. 2003-80559

However, if the intermediate plate to which the motor supporting and rotationally driving the screw advances and retracts on the sliding base via the linear guide, when the linear motion mechanism advances and retracts the intermediate plate, the intermediate plate travels inappropriately forward and backward, making the advancing and retracting operation of the screw unstable; this is due to a long distance between the position where the intermediate plate is supported on the sliding base and the positions where the screw and the motor are attached to the intermediate plate.

BRIEF SUMMARY OF THE INVENTION

An object of the present invention is to solve the above-described problems and provide an injection molding machine in which the screw reciprocates smoothly axially.

1. An injection molding machine includes a cylinder, a frame supporting the cylinder, a screw provided in the cylinder, a screw advancing and retracting mechanism advancing and retracting the screw axially in the cylinder, and a screw rotation mechanism rotating the screw around a shaft in the cylinder.

The frame includes a front wall to which the cylinder is attached, a rear wall to which the screw advancing and retracting mechanism is attached, and a side member provided on each of laterally opposite sides of the front wall and the rear wall to connect the front wall and rear wall together.

The screw rotation mechanism includes a driving electric motor, and transmission means for transmitting rotation of the driving electric motor to the screw.

A guide member is provided on each of the side members, the screw advancing and retracting mechanism slidably reciprocates the screw rotation mechanism on the guide members, and the screw reciprocates in the cylinder.

2. The screw rotation mechanism is assembled on the guide members so that a rotational driving shaft of the driving electric motor is positioned opposite the screw across a plane containing the guide members.

3. Between each of the guide members and the corresponding side member, a guide member support structure is provided which resists flexural deformation of the side member to prevent the flexural deformation from being transmitted to the guide member.

4. The guide member support structure includes a support member supporting the guide members, opposite ends of the support member being fastened to the respective side members.

5. In the guide member support structure, the support member is contacted with the side members only at fastening portions of the support member.

6. The injection molding machine further includes a base frame on which the frame is loaded, a base on which the base frame is loaded, and a base frame guide member provided on the base to guide the base frame. The frame in the injection molding machine is turnably mounted on the base frame.

The guide member is provided on each of the side members provided on both the front wall and the rear wall to connect the front wall and the rear wall together. The screw rotation member slidably reciprocates on the guide members. Thus, the screw can be smoothly reciprocated.

Furthermore, the screw rotating mechanism is assembled on the guide members so that the rotational driving shaft of the driving electric motor of the screw rotation mechanism is positioned opposite the screw across the plane containing the guide members. Consequently, the screw can further be smoothly reciprocated.

Furthermore, the guide member support structure allows the support member to contact the side members only at the opposite ends of the support member. Thus, even if the side members are subjected to flexural deformation, the deformation is prevented from being transmitted to the guide members. As a result, the screw can be smoothly reciprocated.

The guide member is provided on each of the side members. The frame configured to allow the screw rotation mechanism to slidably reciprocate on the guide members is turnably mounted on the base frame. Thus, the turning section can be miniaturized and simplified, allowing a turning operation to be easily performed.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 5:
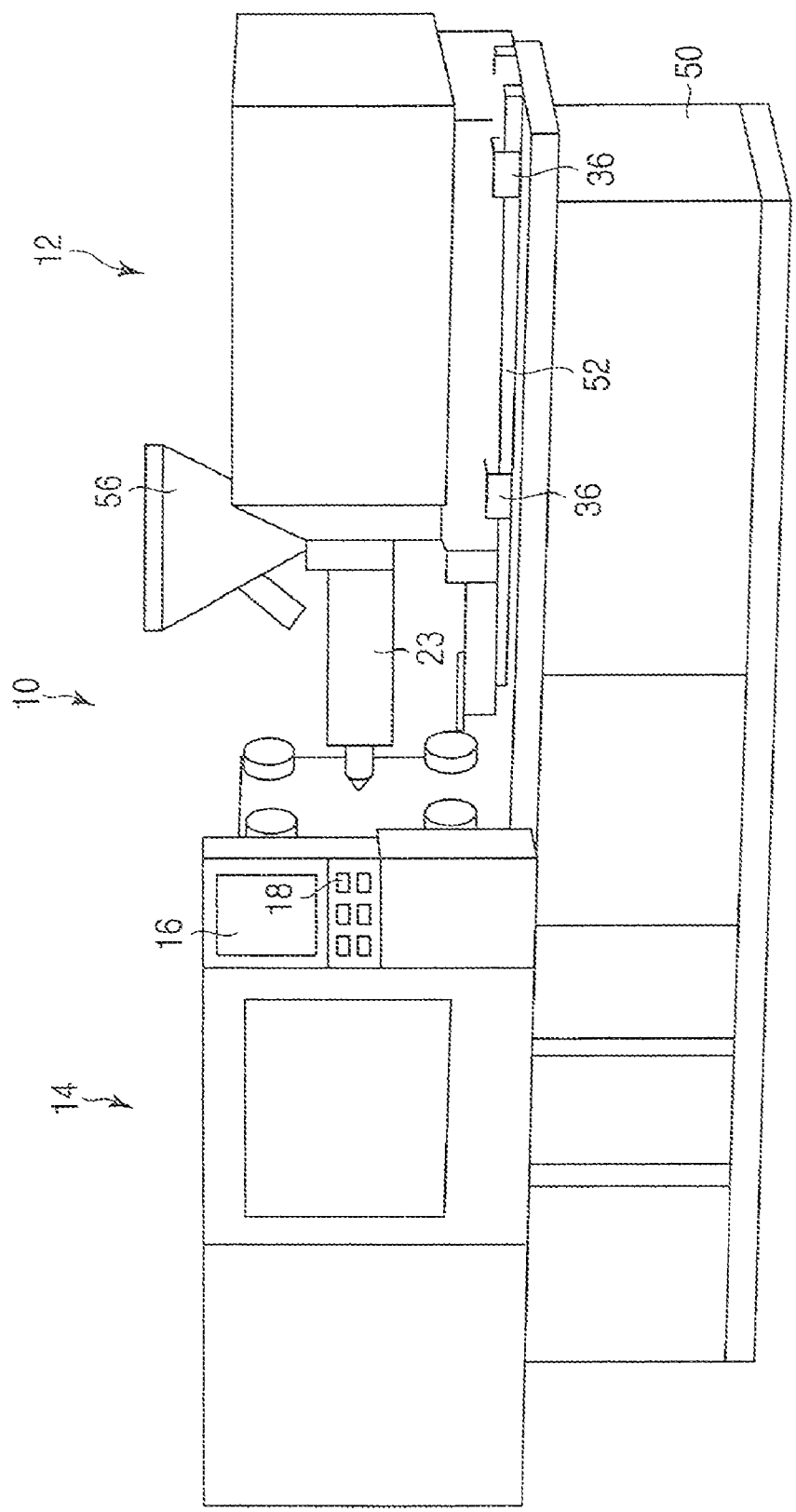
FIG. 5 is a perspective view showing the injection molding machine.

An embodiment of an injection molding machine according to the present invention will be described with reference to the drawings. FIG. 5 generally shows an injection molding machine 10.

The injection molding machine 10 is composed of a base 50, an injection apparatus 12 provided on the base 50, a mold clamping apparatus 14, and the like. Furthermore, display means 16 and input means 18 are provided in almost the center of the injection molding machine 10.

The base 50 is shaped generally like a rectangular parallelepiped, and has a first rail 52 provided on the top surface of the base and serving as a base frame guide member. The first rail 52 is provided longitudinally relative to the base 50. The injection apparatus 12 is movably placed on the first rail 52. On the left side of the base 50, the mold clamping apparatus 14 is provided opposite the injection apparatus 12.

The mold clamping apparatus 14 includes a mold clamping mechanism to open and close a mold (not shown in the drawings) assembled in the mold clamping mechanism. The mold clamping apparatus 14 has a well-known mechanism and configuration and appropriately includes a pressure detection sensor and a position detection sensor to detect the pressure during an opening or closing operation, the open or closed status, or the like. The mold clamping apparatus 14 preferably operates according to a servomotor driving scheme but may be based on a hydraulic driving scheme. A cover is provided outside each of the injection apparatus 12 and the mold clamping apparatus 14. FIG. 5 shows that the injection apparatus 12 and mold clamping apparatus 14 are enclosed by the respective covers.

Figure 1:
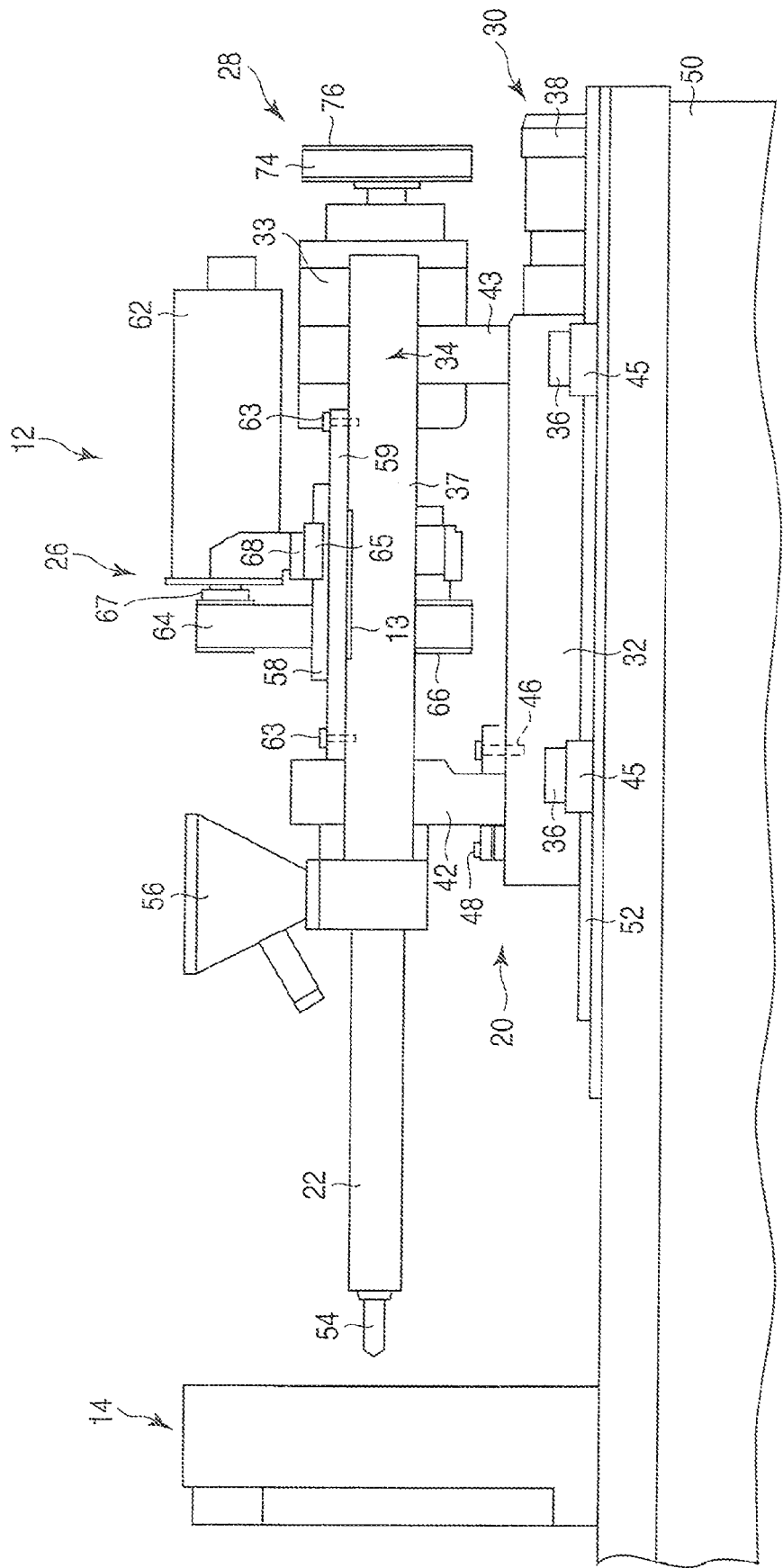
FIG. 1 is a side view showing an embodiment of an injection apparatus of an injection molding machine according to the present invention.
Figure 2:
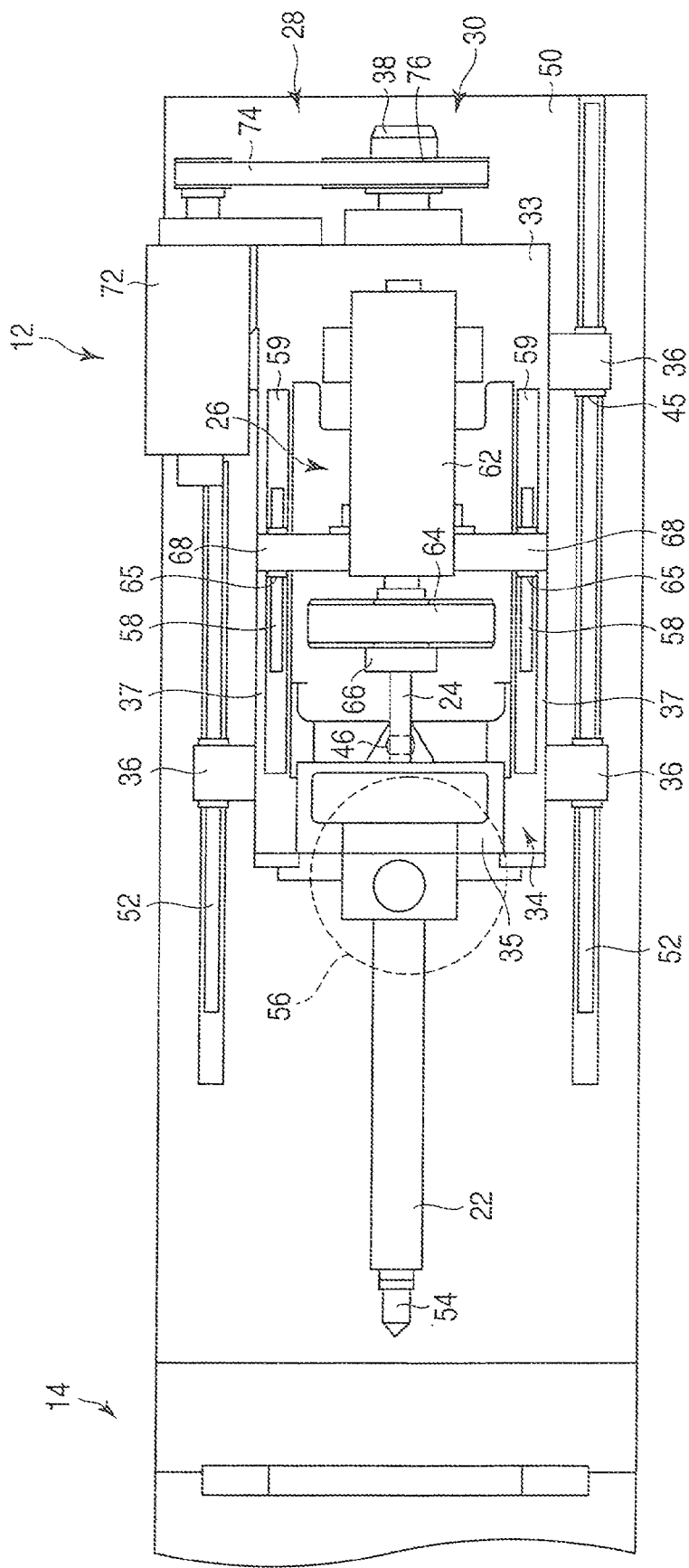
FIG. 2 is a plan view showing the embodiment of the injection apparatus shown in FIG. 1.

The injection apparatus 12 is shown in FIGS. 1 and 2. In the description below, the mold clamping apparatus 14 side of the injection apparatus 12 is defined as a front side, based on which a rear side, a right side, and a left side are defined. The direction of gravity is defined as downward and the opposite direction is defined as upward. The injection apparatus 12 is composed of, for example, a main frame 20, a cylinder 22 provided in front of (the left side of the figures) the main frame 20, a screw 24 (FIG. 3) provided inside the cylinder 22, a screw rotation mechanism 26 rotating the screw 24 around a center shaft, a screw advancing and retracting mechanism 28 advancing and retracting the screw 24 axially, and a propulsion mechanism 30 moving the injection apparatus 12 on the first rail 52.

The main frame 20 is formed of a base frame 32 and an upper frame 34 mounted on the base frame 32. The base frame 32 is a flat frame and includes support legs 36 on the respective lateral sides of the base frame 32. Each of the support legs 36 has a sliding table 45 and is movably placed on the first rail 52 via the sliding table 45. Thus, the base frame 32 is slidably supported on the base 50.

Figure 3:
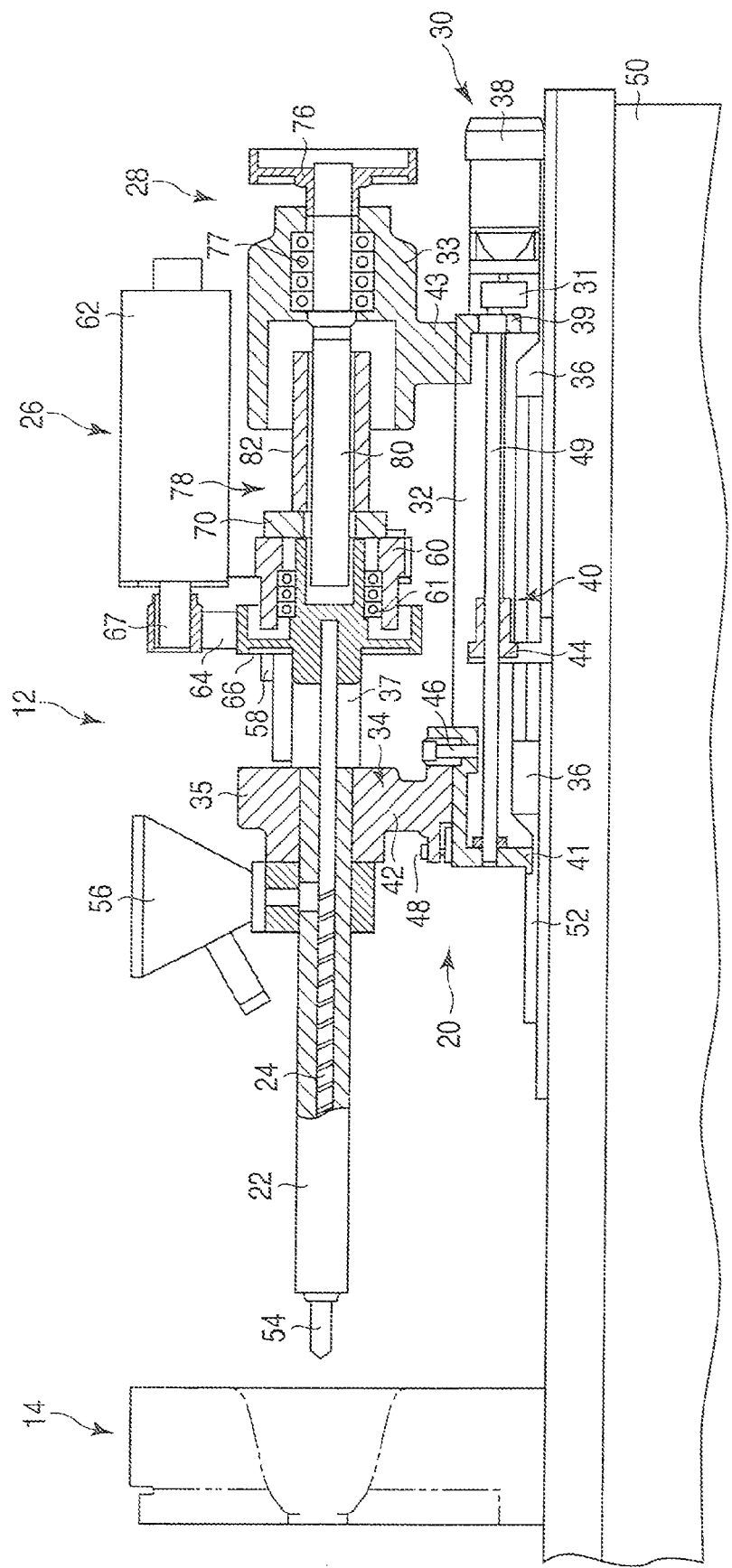
FIG. 3 is a sectional view of the embodiment of the injection apparatus shown in FIG. 1.

As shown in FIG. 3, the propulsion mechanism 30 is composed of a driving electric motor 38 and a ball screw mechanism 40. The driving electric motor 38 is attached to a rear wall 39 (the right side of the figure) of the base frame 32. A driving shaft of the driving electric motor 38 penetrates the rear wall 39 and is coupled to a threaded section 49 of the ball screw mechanism 40 via a gear mechanism 31. The threaded section 49 penetrates almost the center of the base frame 32. The tip side of the threaded section 49 is pivotally movably supported on a front wall 41 of the base frame 32. A nut section 44 of the ball screw mechanism 40 threadably fitted around the threaded portion 49 is fixed to the top surface of the base 50 inside the base frame 32.

As shown in FIG. 2, the frame 34 is a shaped like a rectangular frame composed of a rear wall 33, a front wall 35, and sidewalls 37 serving as lateral side members. A front leg 42 is provided under the front wall 35. A rear leg 43 is provided under the rear wall 33. The front leg 42 is fixed to the base frame 32 via a support pin 46 and a set screw 48. When the set screw 48 is unfixed, the rear leg 43 moves slidably on the base frame 32, and the frame 34 turns around the support pin 46. The right and left sidewalls need not have the same shape and need not be shaped like walls or plates but may be cylindrical or angled. Moreover, it is not necessary that the ends of each of the sidewalls 37 are attached to the front surface of the rear wall 33 and the rear surface of the front wall 35. The sidewall may have an overall length equal to the length of the frame 34 from front to back and may be attached to the side of each the rear wall 33 and the front wall 35.

A cylinder 22 is attached to the front wall 35 of the upper frame 34. The cylinder 22 extends forward, and includes a nozzle section 54 provided at the tip of the cylinder 22 and which is brought into tight contact with a mold (fixing plate). Furthermore, a hopper 56 (see FIGS. 1 and 3) is provided at the base end side of the cylinder 22. The hopper 56 communicates with the inside of the cylinder 22 to supply the cylinder 22 with pellets that are material resin. A heating apparatus 23 (see FIG. 5) is provided around the outer periphery of the cylinder 22.

Second rails 58 serving as a guide member are provided on the respective lateral sidewalls 37 via respective support members 59 forming a guide member support structure. Each of the second rails 58 is fixed to the top surface of the corresponding support member 59 parallel to the axis of the cylinder 22. A sliding table 65 provided on a stay 68 described below is movably placed on the top surface of each of the second rails 58.

A linear guide system composed of a linear guide and a guide block may be used for the second rail 58 and the sliding table 65. However, not only the linear guide system but also any other guide form may be used.

Now, the guide member support structure will be described.

The support member 59 is provided on the top surface of and along each of the right and left sidewalls 37.

Both the front and rear end of the support member 59 are fixed to the top surface of each of the sidewalls 37 by set screws 63. The intermediate portion of the support member 59 is not fixed to the top surface of the sidewall 37. Thus, even if the sidewall 37 is flexed laterally, the support member 59 resists the flexure to prevent the flexure from being transmitted to the second rail 58, serving as a guide member.

Moreover, a recess portion 13 is formed in the top surface of the sidewall 37. Both the front and rear ends of the support member 59 are fastened to the top surface of the sidewall 37 so as to span the recess portion 13. The intermediate portion of the support member 59 is not in contact with the sidewall 37. Thus, even if the wall 37 is flexed vertically, the support member 59 resists the flexure to prevent the flexure from being transmitted to the second rail 58, serving as a guide member.

The recess portion 13 is not limited to the one formed by processing the top surface of the sidewall 37. The recess portion 13 may have any other shape and structure provided that the recess portion 13 forms a gap between the intermediate portion of the support member 59 and the sidewall 37. Alternatively, instead of fixing the support member 59 to the top surface of the sidewall 37, it is possible to fix one end of the support member 59 to the sidewall 37, while fixing the other end to one of the rear wall 33 and the front wall 35. Alternatively, the front and rear ends of the support member 59 may be fixed to the rear wall 33 and the front wall 35, respectively.

The screw 24 is reciprocatably and rotatably provided in the cylinder 22. The base end side of the screw 24 is coupled to a pulley 66 of the rotation mechanism 26 described below.

The rotation mechanism 26 is composed of a rotation mechanism main body section 60, a driving electric motor 62, a transmission belt 64, a pulley 66, and the like. The rotation mechanism main body section 60 includes the stay 68 extending laterally from the rotation mechanism main body section 60. The sliding table 65 is provided at each end of the stay 68. The sliding table 65 is slidably placed on the second rail 58 to enable the screw rotation mechanism 26 to move with respect to the frame 34.

The driving electric motor 62 is attached to the upper portion of the rotation mechanism main body section 60. The pulley 66 is rotatably provided in front of the rotation mechanism main body section 60 via a bearing 61. The pulley 66 is coupled to a rotational driving shaft 67 of the driving electric motor 62 via the transmission belt 64. The screw 24 is coaxially and integrally fixed to the pulley 66 as described above.

The rotational driving shaft 67 is located above a plane (not shown in the drawings) containing the top surface of the each of the lateral second rails 58, which is a sliding surface. Furthermore, the screw 24 is located below the plane. The top surface of the second rail 58 is located between the rotational driving shaft 67 and the screw 24. Thus, the screw rotation mechanism 26 slides smoothly on the second rail 58, allowing the screw 24 coupled to the screw rotation mechanism 26 to reciprocate smoothly. The screw advancing and retracting mechanism 28 is provided behind the rotation mechanism main body section 60 via a load cell 70.

The screw advancing and retracting mechanism 28 is composed of a driving electric motor 72, a transmission belt 74, a pulley 76, a ball screw mechanism 78, and the like. The driving electric motor 72 is attached to a side of the frame 34. A driving shaft of the driving electric motor 72 is coupled to the pulley 76 via the transmission belt 74.

The pulley 76 is pivotally movably supported on the rear wall 33 of frame 34 by a bearing 77. A threaded section 80 of the ball screw mechanism 78 is integrally coupled to the pulley 76. The threaded section 80 is formed coaxially with the screw 24 and threadably fitted into a nut section 82 of the ball screw mechanism 78. The nut section 82 is cylindrical, and the front end surface of the nut section 82 is integrally fixed to the rear surface of the load cell 70.

The load cell 70 is a load measurement instrument measuring a load imposed axially, and is composed of a cylindrical strain inducer and a strain sensor attached to the strain inducer (neither of the strain inducer and the strain sensor is shown in the drawings). An inner diameter larger than the outer diameter of the threaded section 80 is formed in the center of the load cell 70. As described above, the left side surface of the load cell 70, as seen in the figures, is coupled to the rotation mechanism main body section 60. The right side surface of the load cell 70, as seen in the figures, is fixed to the nut section 82. An output terminal of the load cell 70 is connected to a control apparatus (not shown in the drawings). When pressure is exerted on the load cell 70, the output terminal outputs an output signal corresponding to the pressure, to the control apparatus.

Now, the operation of the injection molding machine 10 will be described.

First, the propulsion mechanism 30 is actuated. The driving electric motor 38, included in the propulsion mechanism 30, is driven to rotate the threaded section 49. The rotated threaded section 49 advances spirally using the nut section 44 threadably fitted around the threaded portion 49 and fixed to the base 50. At the same time, the base frame 32 advances on the first rail 52. The advancing of the base frame 32 advances the injection apparatus 12. The injection apparatus 12 advances to bring the nozzle section 54 of the cylinder 22 into abutting contact with the mold. When the nozzle section 54 is tightly contacted with the mold under a predetermined pressure, the propulsion mechanism 30 stops, resulting in a nozzle touch condition.

Then, with the hopper 56 filled with pellets as a material, the screw rotation mechanism 26 is actuated. The driving electric motor 62, included in the screw rotation mechanism 26, is driven to rotate the pulley 66 via the transmission belt 64. The screw 24 thus rotates in the cylinder 22. Furthermore, the screw advancing and retracting mechanism 28 is driven to retract the screw in the cylinder 22.

Then, the pellets fed from the hopper 56 into the cylinder 22 are conveyed, by the rotation of the screw 24, through the cylinder 22 heated by the heating apparatus 23. The pellets are thus melted and kneaded and then stored in the tip of the cylinder 22 in the form of molten resin.

Once the predetermined molten resin is stored in the tip of the cylinder 22 and injection is thus prepared for, the screw advancing and retracting mechanism 28 is actuated. The driving electric motor 72, included in the screw advancing and retracting mechanism 28, is driven to rotate the pulley 76 via the transmission belt 74. The threaded section 80 is rotated. When the threaded portion 80 is spirally rotated, the nut section 82 threadably fitted around the threaded section 80 advances. When the nut section 82 advances, the rotation mechanism main body section 60 supported on the second rail 58 moves via the load cell 70 to advance the pulley 66. Thus, the screw 24 advances to allow the molten resin to be injected from the cylinder 22 into the mold clamped by the mold clamping apparatus 14, through the nozzle section 54.

The injected resin exerts a force of reaction acting backward, that is, rightward in the figures, on the screw 24. The force is transmitted from the rear end of the screw 24 to the pulley 66 and then via the bearing 61 to the rotation mechanism main body section 60. The load cell 70 is then pressed. The load cell 70 has the nut section 82 attached to a surface of the load cell 70 located opposite the screw 24; the nut section 82 is threadably fitted around the threaded section 80.

Thus, the load cell 70 is pressed from both sides axially to measure the pressure applied to the screw 24. An output signal from the load cell 70 is transmitted to the control apparatus as described above. The control apparatus then determines whether or not the predetermined resin has been reliably filled into the mold.

Once the resin is filled into the mold under the predetermined pressure and the pressure is successfully maintained, the following operation is performed in the injection apparatus 12 in order to continuously perform the next molding. With the nozzle touch condition maintained, the screw rotation mechanism 26 rotates the screw 24. Furthermore, the screw advancing and retracting mechanism 28 retracts the screw 24, while molten resin is stored in the tip of the cylinder 22 as described above.

When the mold is opened and the product formed is taken out, the mold clamping apparatus 14 clamps the mold again for the next molding.

In this operation, the screw 24 can be smoothly reciprocated because the second rail 58 is provided on each of the sidewalls 37 of the frame 34 so as to allow the screw rotation mechanism 26 to be slidably reciprocated on the second rails 58.

Furthermore, when the screw advancing and retracting mechanism 28 is actuated to advance the screw rotation mechanism 26 and the screw 24 to allow the molten resin stored in the cylinder 22 to be injected into the mold, the sidewall 37 may be flexurally deformed by the force of reaction acting on the frame 34. Even in this case, the guide member support structure prevents the deformation from being transmitted to the second rail 58. The screw 24 can thus be smoothly reciprocated.

Now, turning movement of the injection apparatus 12 will be described.

First, in order to prevent the mold clamping apparatus 14 from interfering with the turning injection apparatus 12, the propulsion mechanism 30 is actuated to retract the injection apparatus 12.

Then, the set screw 48 is loosened to decouple the base frame 32 from the frame 34.

The frame 34 is placed on the base frame 32 such that the second rail 58, serving as a guide member, is provided on each of the sidewalls 37 and such that the screw rotation mechanism 26 reciprocates on the second rails 58. Thus, simply by decoupling the base frame 32 from the frame 34, the frame 34 can be turned around the support pin 46.

Figure 4:
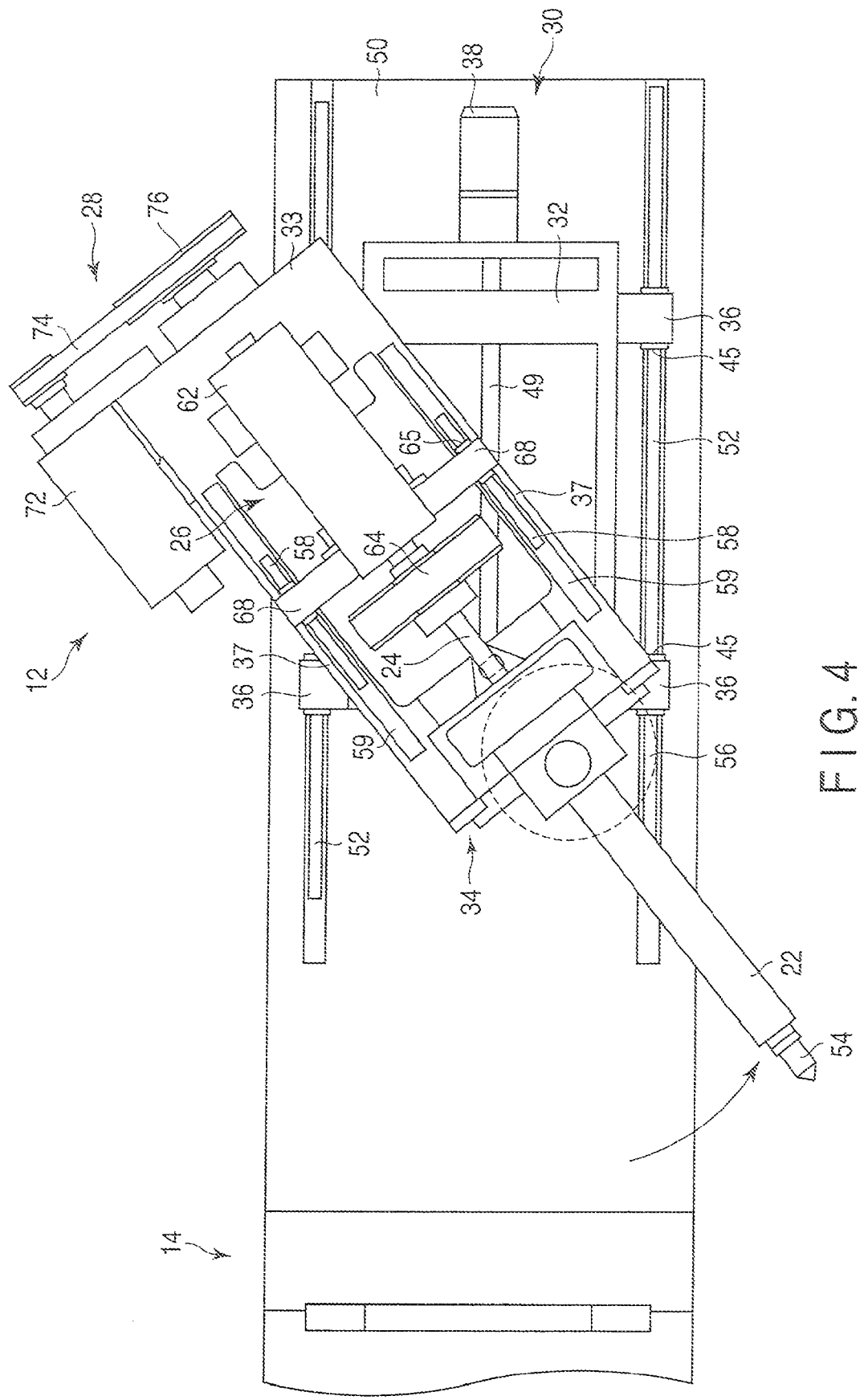
FIG. 4 is a perspective view showing that the injection apparatus is turned.

FIG. 4 shows that the injection apparatus 12 is turned between the base frame 32 and frame 34 of the main frame 20.

Thus, in the injection molding machine 10, the injection apparatus 12 can be turned around the support pin 46 between the base frame 32 and the frame 34. The turning operation of the injection apparatus 12 can be performed with the rear leg 43 slidably moved on the base frame 32. Thus, for example, when the cylinder 22 or the screw 24 is cleaned or replaced, the injection apparatus 12 can be easily and safely rotated.

What is claimed is:

1. An injection molding machine comprising:
a cylinder;
a frame supporting the cylinder;
a screw provided in the cylinder;
a screw advancing and retracting mechanism advancing and retracting the screw axially in the cylinder; and
a screw rotation mechanism rotating the screw around a shaft in the cylinder,
wherein the frame comprises:
a front wall to which the cylinder is attached;
a rear wall to which the screw advancing and retracting mechanism is attached; and
a side member provided on each of laterally opposite sides of the front wall and the rear wall to connect the front wall and rear wall together, and
the screw rotation mechanism includes:
a driving electric motor; and
transmission means for transmitting rotation of the driving electric motor to the screw, and
a guide member is provided on each of the side members,
the screw advancing and retracting mechanism slidably reciprocates the screw rotation mechanism on the guide members, and
the screw reciprocates in the cylinder.

2. The injection molding machine according to claim 1, wherein the screw rotation mechanism is assembled on the guide members so that a rotational driving shaft of the driving electric motor is positioned opposite the screw across a plane containing the guide members.

3. The injection molding machine according to claim 1 or 2, wherein between each of the guide members and the corresponding side member, a guide member support structure is provided which resists flexural deformation of the side member to prevent the flexural deformation from being transmitted to the guide member.

4. The injection molding machine according to claim 3, wherein the guide member support structure includes:
a support member supporting the guide members, opposite ends of the support member being fastened to the respective side members.

5. The injection molding machine according to claim 4, wherein in the guide member support structure,
the support member is contacted with the side members only at fastening portions of the support member.

6. The injection molding machine according to claim 1, further comprising:
a base frame on which the frame is loaded;
a base on which the base frame is loaded; and
a base frame guide member provided on the base to guide the base frame,
wherein the frame is turnably mounted on the base frame.

* * * * *